United States Patent [19]

Nijenhuis

[11] Patent Number: 4,802,811
[45] Date of Patent: Feb. 7, 1989

[54] APPARATUS FOR LOADING AND UNLOADING AN INTERCHANGEABLE CONTAINER ONTO AND FROM A VEHICLE

[75] Inventor: Derk Nijenhuis, Hoogeveen, Netherlands

[73] Assignee: N.C.H. Hydraulische Systemen BV, Hoogeveen, Netherlands

[21] Appl. No.: 4,058

[22] Filed: Jan. 16, 1987

Related U.S. Application Data

[63] Continuation of Ser. No. 723,964, filed as PCT NL84/00026 on Aug. 13, 1984, published as WO85/00787 on Feb. 28, 1985, abandoned.

[51] Int. Cl.$^4$ ................ B60P 1/64; B65G 63/02; B65G 67/02
[52] U.S. Cl. .................... 414/478; 414/480; 414/494; 414/500
[58] Field of Search .......... 414/349, 350, 491, 494, 414/495, 498, 500, 541, 542, 473, 474, 478, 480, 486, 718, 24.5, 912, 618, 621, 477; 294/2, 82.1, 68.3, 81.5, 67.3

[56] References Cited

U.S. PATENT DOCUMENTS

| | | | |
|---|---|---|---|
| 3,115,262 | 12/1963 | Avery | 414/618 X |
| 3,148,909 | 9/1964 | Tantlinger | 294/81.5 X |
| 3,155,258 | 11/1964 | Fincannon | 414/498 |
| 3,433,370 | 3/1969 | Eisert et al. | 414/912 X |
| 3,467,268 | 9/1969 | Corompt | 414/494 |
| 3,510,019 | 5/1970 | Howard | 294/67.3 |
| 3,720,328 | 3/1973 | MacKenzie | 414/500 X |
| 3,836,025 | 9/1974 | Olson et al. | 414/718 X |
| 3,964,626 | 6/1976 | Arregui | 414/500 X |
| 4,058,231 | 11/1977 | Visa et al. | 414/494 |
| 4,109,810 | 8/1978 | Jones | 414/494 X |
| 4,153,169 | 5/1979 | Cipkowski | 414/494 X |
| 4,302,139 | 11/1981 | Malish | 414/24.5 |
| 4,352,625 | 10/1982 | Bolderoff | 414/494 |
| 4,358,145 | 11/1982 | Svensson | 294/68.3 |
| 4,474,495 | 10/1984 | Ledwell, Jr. | 414/621 X |

FOREIGN PATENT DOCUMENTS

| | | |
|---|---|---|
| 1957723 | 11/1969 | Fed. Rep. of Germany . |
| 2248350 | 10/1972 | Fed. Rep. of Germany . |
| 2758693 | 7/1979 | Fed. Rep. of Germany . |
| 61011 | 5/1977 | Japan .................. 414/542 |
| 128236 | 9/1969 | Netherlands . |
| 7213255 | 4/1973 | Netherlands . |
| 7907588 | 5/1980 | Netherlands . |
| 8200766 | 9/1983 | Netherlands . |

Primary Examiner—Frank E. Werner
Assistant Examiner—David A. Bucci
Attorney, Agent, or Firm—Parmelee, Bollinger & Bramblett

[57] ABSTRACT

A self-loading vehicle is equipped with a carriage movably mounted on a frame. The carriage may contain a plurality of different types of gripping structure in order to adapt the self-loading vehicle to accommodate the loading and unloading of different types of containers. The carriage may be moved on the frame by cables. The carriage includes a gripping structure in the form of a positionable tube carrying coupling members on opposite ends therefor adapted to engage slot-like castings in opposite corners of the containers. In addition, the carriage may also have gripping structure removably mounted thereon in the forms of hooks, lugs, eyes or rings which are adapted to engage cooperating structure on the container to be loaded and/or unloaded.

5 Claims, 4 Drawing Sheets

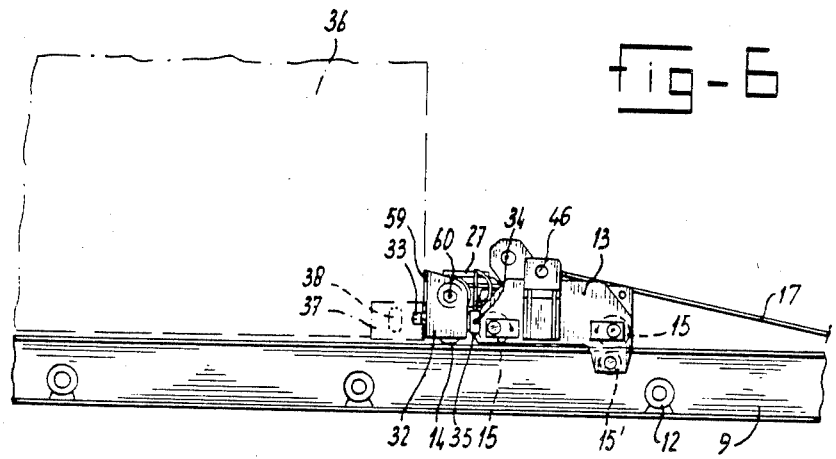
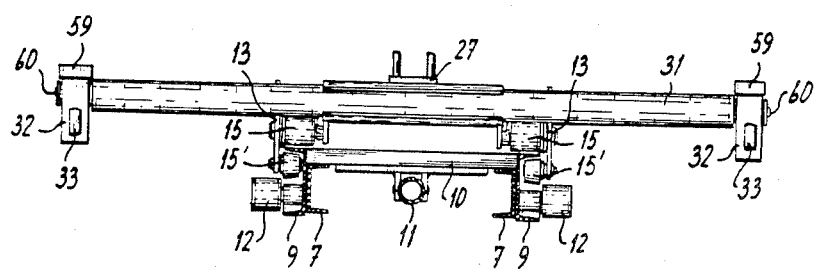

APPARATUS FOR LOADING AND UNLOADING AN INTERCHANGEABLE CONTAINER ONTO AND FROM A VEHICLE

This is a continuation of co-pending application Ser. No. 723,964 filed PCT NL 84/00026 on Aug. 13, 1984, published as WO85/00787 on Feb. 28, 1985, now abandoned.

BACKGROUND OF THE INVENTION

The invention relates to an apparatus having vertically and horizontally movable gripping means for gripping an interchangeable container and bringing it from a lower level onto a supporting surface on a vehicle or other support, and for removing it therefrom.

Many type of apparatus of this kind are known. Their gripping means are adapted for the gripping means with which the containers are provided.

Containers exist which have gripping means consisting of hooks or eyes projecting sideways from their horizontal bearers (Dutch patent specification No. 128,236), a central hook or eye under the container (German preliminary published patent application No. 1,957,723), a hook or eye at the bottom of the front side of the container (Dutch patent application No. 72.13255, FIGS. 8 and 9), a hook or eye at the top of the front side of the container (Dutch patent application No. 79.07588), and there are also so-called sea containers having eyes in corner pieces at top and bottom (so-called corner castings, Dutch patent application No. 72.13255, FIGS. 1 to 7).

SUMMARY OF THE INVENTION

The invention now seeks to make it possible for containers having different gripping means to be easily picked up and set down with one and the same apparatus of the type defined.

To this end, an apparatus according to the invention, of the type initially defined above, is characterized in that the gripping means comprise at least two parts spaced apart horizontally and/or vertically, each of them being adapted to grip, independently of the other, containers having gripping means which, relative to one another, are differently shaped or differently situated and which cooperate with the first-mentioned gripping means.

It is observed that in Dutch patent application No. 82.00766 of the Applicants, which does not constitute a prior publication, it is shown in FIGS. 4 and 5 how two hooks disposed one above the other may be provided on the apparatus, for containers having an eye or hook disposed in a high position on the front side of the container, and for containers having an eye or hook disposed in a lower position on the front side thereof, both however being only conjointly movable up and down on a rigid part adapted to slide up and down, and in the present application no rights are claimed for this arrangement.

The apparatus according to the invention can be of various constructions, and a preferred embodiment is one in which the apparatus has a carriage, known per se, which is adapted to travel over the vehicle or the like and which carries at least one part of the gripping means for raising and lowering the container for the purpose of bringing the latter, together with the carriage, through the travel of the latter, onto the vehicle or other support, this apparatus being characterized in that the carriage carries the two parts of the gripping means which are spaced horizontally and/or vertically apart.

In addition, in an apparatus of this kind, having a carriage, a movable cable or chain preferably also extends along the carrying construction over which the carriage travels, while on the carrying construction there is provided a winch or drive pulley, which does not travel with the carriage, for the cable or chain, the latter having a hook or similar gripping means for gripping a container.

The apparatus may also be provided with means for picking up so-called sea containers having upright pick-up slots in corner pieces (so-called corner castings).

This is desirable because otherwise they may impede the use of other gripping means, for example because they may press against the container, or because otherwise they project needlessly far sideways, these gripping parts - and also the means for picking up sea containers when they are not in use and when only narrower containers have to be picked up - may be mounted for easy removal or folding and thus be removed or folded away when this is desirable for one of the reasons given.

BRIEF DESCRIPTION OF THE DRAWINGS

The invention will now be explained more fully with the aid of the accompanying drawings, in which:

FIG. 6 is a partial side view of a tipping bridge with gripping means in operation for a sea container, and FIG. 7 is a rear view of the tipping bridge shown in FIG. 6.

DESCRIPTION OF THE PREFERRED EMBODIMENT

Figure 1:
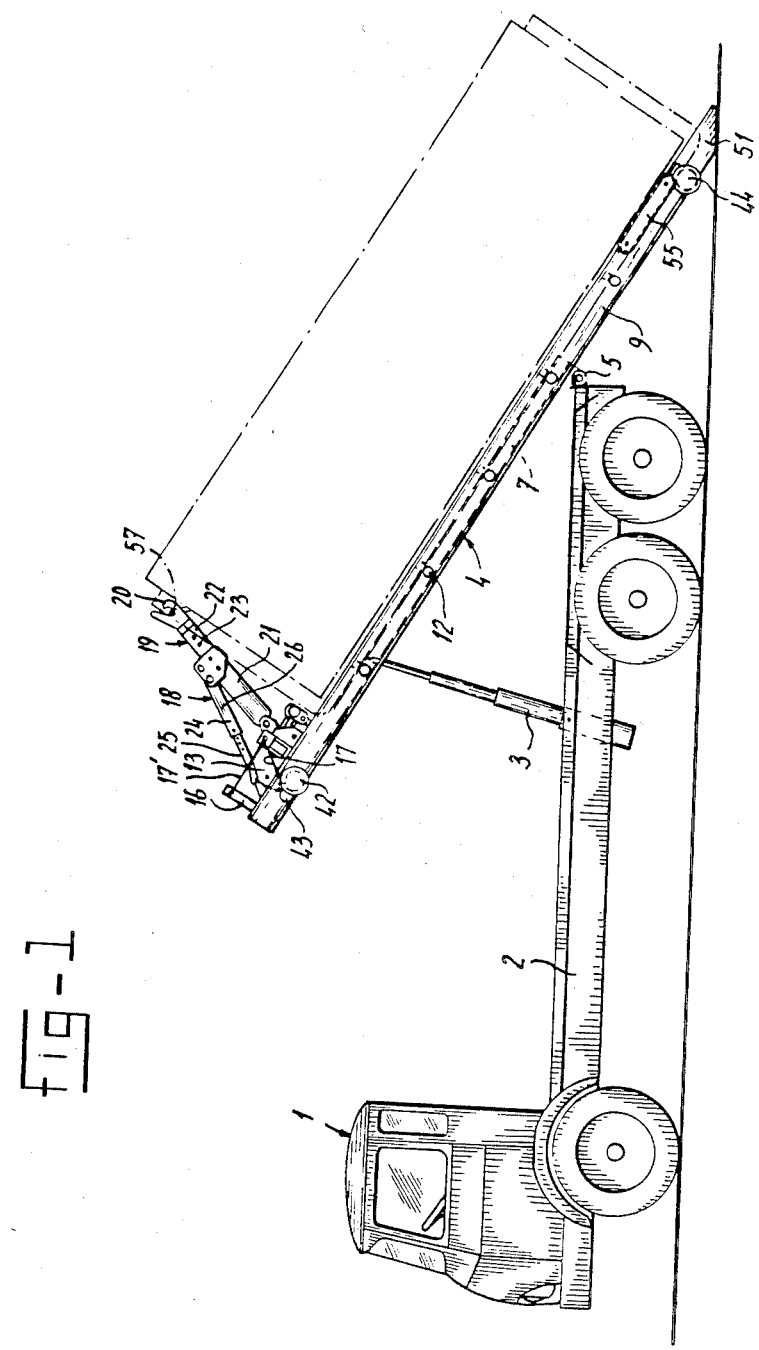
FIG. 1 is a schematic side view of an apparatus according to the invention in an intermediate state in the picking up or setting down of a container.
Figure 2:
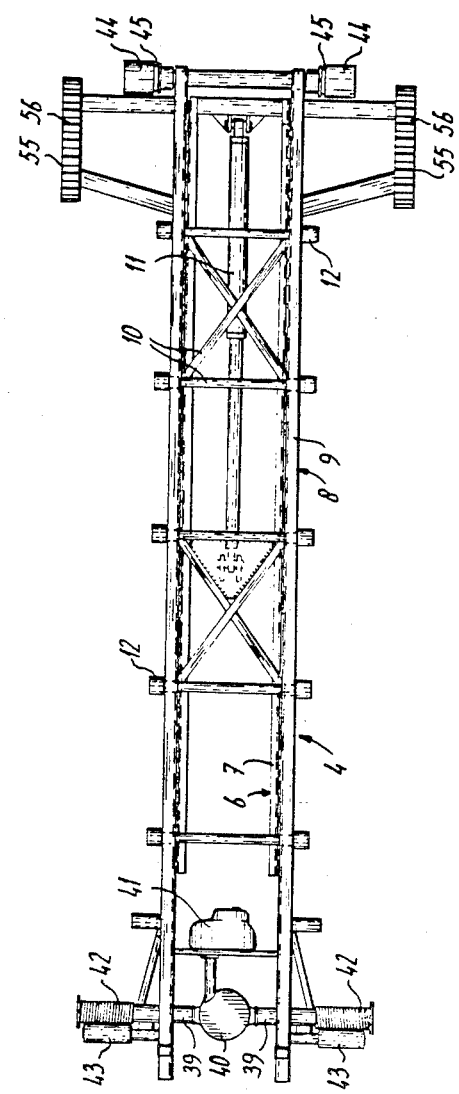
FIG. 2 is a top plan view of a tipping bridge as part of the apparatus shown in FIG. 1.

A vehicle 1 carries, pivoting in a fixed frame 2, a hydraulic telescopic multicylinder 3 adapted to tip a tipping bridge 4 up and down about a pivot joint 5 at the rear end of the vehicle 1. The tipping bridge comprises a frame 6 pivotally connected to the cylinder 3 and the pivot joint 5 and consisting of two channel sections 7 with a cross connection (not shown), and a carrier frame 8 which is adapted to move in the longitudinal direction relative thereto and is guided thereby, and which consists of channel sections 9 and cross connections. As can be seen in FIGS. 2 and 7, the channel sections 7 lie with their open side inwards, and the channel sections 9 lie with their open side outwards and with their web along the outside of the web of the sections 7. The guidance for the movement of the carrier frame 8 relative to and through the frame 6 can be provided in the usual manner by rollers (not shown). A horizontal hydraulic cylinder 11 connects the two frames 6 and 8, in such a manner that the frame 8 can be pushed by it over and along the frame 6, from a position in which the carrier frame 8 does not project or scarcely projects behind the vehicle (FIG. 2) to a position in which it projects behind the vehicle (FIG. 1).

The sections 9 are provided with carrier rollers 12 projecting outwards therefrom for the purpose of carrying and guiding beams lying thereunder inside the side edges of containers.

A carriage 13 is adapted to travel, with the aid of rollers 14 and 15, over the horizontal top flanges of the sections 9, and is secured at the front side against tilting by means of rollers 15' engaging under the flanges.

At the front end of the carrier frame 8 of the tipping bridge 4 are situated cable drums 42, which will be described later on and which are connected via cables 17 to the carriage 13 for the purpose of moving the latter in one direction, namely towards the cab of the vehicle. When the tipping bridge 4 is in an inclined position, as shown in FIG. 1, the carriage will move through its own weight in the opposite direction. If it should be desired to move the carriage in the other direction while the tipping bridge lies horizontally, it is possible to install on the carriage a cable which serves to pull it back and which is guided over a roller near the other end of the tipping bridge and can be wound up by a drum 42 or a separate winch as the cable 17 is wound off, and vice versa.

Figure 3:
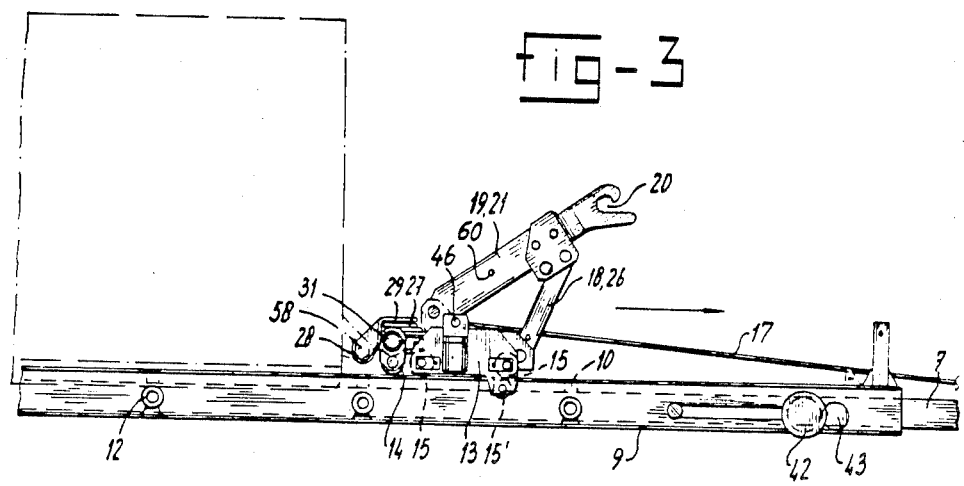
FIG. 3 is a partial side view of this tipping bridge in the horizontal position with a container partly pushed onto it.

FIGS. 1 and 3 show how the carriage has a pivoting strut 18 and an upwardly projecting pivoting hooked arm 19 ending in an open hook 20. The hooked arm 19 comprises a box grinder 21, for example square in shape, in which a smaller box girder 22 is slidable and can be fastened in various positions by means of a pin engaged in coinciding holes 23. The strut 18 likewise consists of two parts 25 and 26 slidable one in the other and adapted to be fastened in different positions with the aid of a pin and coinciding holes 24. By adjusting the strut 18 to a desired length, the hooked arm 19 is thus brought into the desired angular position, and by varying the length of the arm 19 the hook 20 can be brought to the desired height for adaptation to the height of the gripping projection on the container which is to be picked up. If the hook 20 is not to be used because one of the other gripping means, which are still to be described, has to be used, and if the arm 19 is inclined towards the container (in the position shown in FIG. 1) it may then cause an obstruction, the arm 19 can be brought into its shortest position and also optionally by the shortening of the strut 18 be swung back to the position shown in FIG. 3.

Figure 4:
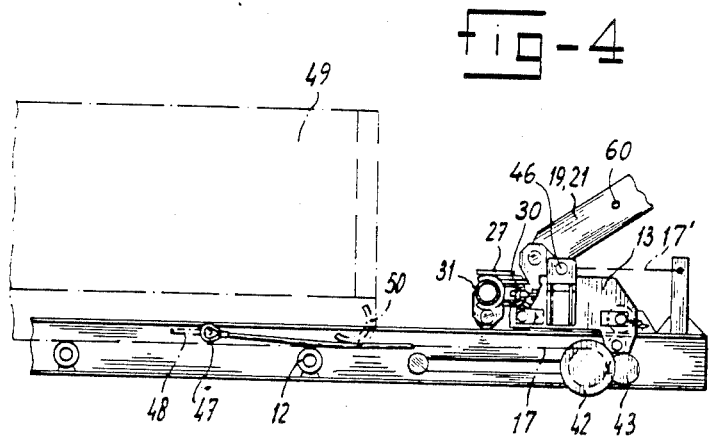
FIG. 4 is a similar side view with different gripping means in operation than in FIG. 3.

The carriage 13 also carries a table 27 with a hook 28 (FIG. 3), which by means of strong plate joints is secured to a horizontal plate 29 which lies on the table 27 and is joined thereto in such a manner as to be easily detachable, for example with the aid of bolts. The hook 28 can thus act on a gripping projection at the bottom of a container, as shown in FIG. 3. When the hook 28 is not used, and, if use is made of one of the other gripping means on the apparatus, may be in the way, for example because it may then bear against the container, the hook can be removed easily by unbolting, as shown in FIGS. 1 and 4.

Under the table 27 is disposed a horizontal cross tube 31, which by means of projecting parts is mounted on the carriage 13 in such a manner that it can turn to some extent about a vertical pin 30 (FIG. 4), the pin being mounted in the carriage 13 by means of a horizontal pivot extending in the longitudinal direction of the vehicle and adapted to turn to some extent in a bearing, so that the tube 31 can also turn to some extent about an axis in the longitudinal direction of the vehicle. When the pin 30 is removed, the tube 31 can be completely detached from the carriage 13 and removed.

At each end of the tube 31 the latter carries a coupling member 32, in which a flat boss 33 is rotatable about a horizontal axis in the plane of FIG. 6 and at right angles to the plane of FIG. 7. This rotation can be effected by introducing the pin portion of a hand brace into an opening 34 in a part 35 projecting behind the coupling member 32 and fastened to the boss 33. The flat boss 33 can thus be turned from the vertical position shown in FIG. 7 to a horizontal position, and vice versa. Each coupling member 32 can be carried by the tube 31 for pivoting about the longitudinal axis of the said tube, namely about pivots 60 thereon. Through the abovedescribed rotatability of the tube 31 on the carriage 13, about two axes at right angles to one another and through the pivotability of the coupling members 32, the bosses 33 can be adapted in position to mutual differences in angular position of the vehicle and the sea containers which are to be picked up. A container 36 of this kind is equipped as standard with so-called corner castings 37 at the corners, with upright slot-like openings 38 through which the flat bosses can pass. The bosses 33 can thus be brought into the vertical position and passed through the slots 38 directed towards the vehicle, and then turned 90° in the manner described in order to joint the carriage 13 firmly to the container 36, as is known per se and customary.

The slidable carrier frame 8 is provided at the front side with two cross axles 39 lying in line with one another and driven via a differential 40 by a drive means 41, for example a hydraulic motor fed with oil via a hose by a pump on the engine of the vehicle, as is known per se. Each of the cross axles 39 carries outside the frame a cable drum 42, against which a freely rotatable rubber roller 43 can press in order to secure a cable sufficiently on the drum 42 and to hold it in the helical groove in the drum. At the rear side of the frame 8 are disposed rollers 44 provided with a cable groove 45. In FIG. 4 it is indicated how the cables 17 run from these drums towards the rear, and how each of them can be provided with a cable thimble 47 engaged on a hook 48 against the side of a bearer of a container, as known from Dutch patent specification No. 128,236. The container 49 (FIG. 4) carries in this case, in known manner, at the bottom of the front side two guide shoes 50, each of which may be provided with a groove for guiding the cable 17.

If this construction is not used but the operation is carried out with the carriage 13, the cables 17 can be attached to the carriage at 46.

Figure 5:
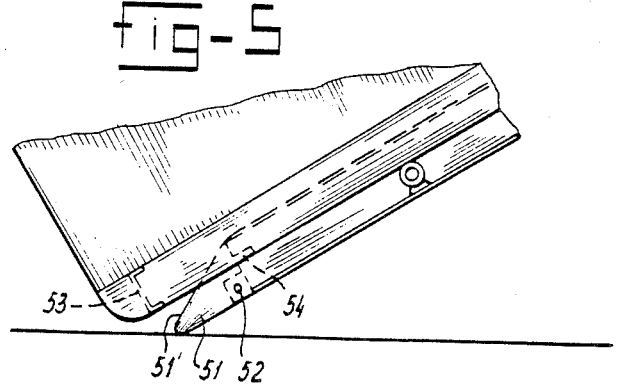
FIG. 5 shows a detail of a different form of construction of the rear end of a tipping bridge with an associated container.

In FIG. 5 it is indicated how the girders 9 of the carrier frame 8 may have at the rear end a detachable guide 51, which can be fastened in a simple manner by lockable pins passing through holes 52 in parts of the girders 9 and members 51 which extend along one another. If the girders 9 of the carrier frame 8 are displaced backwards onto the floor, when the tipping bridge is tipped, containers suitable for the purpose can slide by their front edges over the inclined top surfaces 51' of the guides 51 when they are lifted onto the vehicle, for example by means of the hook 20 on the carrier arm 19 or by means of the hook 28. The rollers 14 at the rear of the carriage 13 can be guided over the surfaces 51 in the rearmost positions of the carriage.

In the case of some containers a horizontal cross member 53 is provided at the rear of the bottom face, this member extending in the transverse direction over the girders 9 when the container is on the apparatus. For this purpose the guides 51 can be removed, and the bottom flange of the cross member 53 then slides into a slot 54 when the container is picked up, a projecting part of the guide 51 fitting into this slot 54, which is open to receive the flange when the guide 51 is removed.

The rearmost rollers 14 can be displaced over the part 51' of the path, from their guide path on the girder 9, the front rollers 15 and the bottom rollers 15' thereunder permitting some tipping of the carriage. When the guides 51 are removed, the carriage 13 can travel a shorter distance to the rear, but usually containers provided with a cross member 53 are containers which can be picked up in the manner described in connection with FIG. 4.

In FIG. 1 is shown a differently shaped end piece 51 of the girder 9, but this too must be able to be detached and removed when it is desired to use the system shown in FIG. 4, because during the picking up and setting down of a container it must be possible for the cables 17 to run over the cable grooves 45 in the rollers 44 during a part of their travel and then to run from the cable grooves straight down to the guide shoes 30 and the hooks 48 on a container 49 standing at a lower level.

In FIGS. 1 and 2 it is shown how the carrier frame 8 can have at the rear end, on projecting girders, two guides 55 for guiding the side edges of wide containers, such as sea containers, and for providing stable support for the rear parts of their side edges when containers have been placed completely on the frame. These guides 55 may be formed by stationary slides surfaces, for example of PTFE, or, as illustrated, by endless bands, for example chains with metal cross strips 56, which are driven by friction by the container moving relative to the carrier frame 8.

With regard to the use of the apparatus, the following is additionally applicable:

If a container has to be picked up by means of the hook 20, the loading bridge 4 is placed in an inclined position (FIG. 1) and its carrier frame 8 is pushed out by the cylinder 1 until its rear end is on or almost on the ground. The carriage 13 is moved towards this rear bottom end. Since the arm 20 of the hook is very greatly inclined relative to the container which is to be picked up, because of the inclined position of the tipping bridge, the hook 20 lies in a relatively low position above the ground, so that it can easily be brought under the gripping part 57 (FIG. 1) on the container, while slight differences in horizontal position can be overcome by pushing the carrier frame 8 slightly further or less far out and by slightly moving the vehicle. The tipping bridge can now be brought into a slightly less inclined position by means of the cylinder 3, so that the hook 20 moves slightly upwards so as to engage the gripping member 57. The carriage 13 is now driven forward on the loading bridge 4, and the carrier frame 8 can be pushed forward at the same time, or optionally starting somewhat later. The carriage 13 can thus be moved, relative to the fixed frame 6 of the loading bridge, twice as quickly, in the absolute sense, as the frame 6, and the container is thus brought quickly and smoothly onto the tipping bridge, while the vehicle itself can move backwards in order to push the container over the ground as little as possible. The tipping bridge 4 can now be lowered to the horizontal position as soon as the container is for example positioned with its center of gravity above the pivot point 5.

In the end position the carriage 13 may be secured on the tipping bridge 4 by means which are not shown. When operating with the system shown in Figure 4, that is to say without the carriage 13, it is often expedient for the carriage to be secured against backward movement by means of one or two short cables 17' with thimbles at their ends, attached to points 46 on the carriage and to projections 16 on the front end of the frame 8.

When use is made of the hook 20, in a certain construction the tube 31, with parts at its ends for gripping the containers, may form an obstruction. In this case this tube may be made foldable, relative to the carriage 13, about a transverse axis parallel to the tube, instead of or in addition to the previously mentioned detachability.

When use is made of the hook 28 (FIG. 3) situated in a lower position, the carrier arm 19 of the hook 20 can be swung back, as already stated. The engagement of the hook 28 on a gripping member 58 on the container and the loading of the container onto the tipping bridge can be effected in the same way as has been described for the hook 20.

For the picking-up of a container by the hook 48 (FIG. 4) on the side under the container, the tipping bridge 4 need not always be inclined, but, particularly for heavier containers, this is advisable because the container must otherwise tip forwards into an intermediate position and may thus apply a heavy downward sock to the construction. The cables 17 are guided over the cable grooves 45 at the rear and thence downwards, and are engaged by their thimbles 47 on the hooks 48 of the container. The winch drums 42 are now operated in order to wind the cable. The front side of the container then first moves vertically upwards until the shoes 50 on it rest on the rollers 44, and when the cable is further wound the container slides on the tipping bridge, for example to a position slightly further to the right than the position shown in FIG. 4, while in the meantime the tipping bridge has been brought out of its inclined position (if it was inclined) into the horizontal position during the movement of the container.

For the picking-up of a sea container (FIGS. 6 and 7), the hook 28 can be removed, the carrier arm 19 with the hook 20 either removed or turned back to the position shown in FIGS. 3 and 4, and the member 31 with the gripping means 32 and 33 can be installed, if it had been removed. The carrier frame 8 is pushed out again downwards, with the tipping bridge 4 inclined, until its rear end reaches the ground. As the coupling members 32 are mounted for rotation on the end pivots 60 of the cross tube 31, they hang approximately vertically because of their low center of gravity, so that the vertically disposed gripping bosses 33 can easily be introduced into the respective openings in the corner castings 37 of the container, while the coupling members 32 make contact with the container by means of stop surfaces 59 at their top end in order to guide it into the correct position. When the bosses 33 are turned into the horizontal position, as described, the sea container is locked to the carriage 13, while when the container is brought onto the tipping bridge 4 through the movement of the carriage 13 and of the carrier frame 8, pivoting coupling members 32 follow differences of angle.

The cables 17 should also be able to act on the arm 19, 21, for example at a point 60 (FIGS. 3 and 4) and may then at choice run to the cable drums 42 either direct or via a deflector roller at the bottom of the arm.

I claim:

1. A self-loading and unloading apparatus for a vehicle having a tiltable frame mounted on said vehicle, gripping means movably positioned on said frame for engaging an interchangeable container and lifting said container from a lower level onto said vehicle by vertical and horizontal movements such that a first lower terminal edge of the container is moved onto said vehicle and that thereupon the container is moved longitudinally onto said vehicle until said container is fully supported by said vehicle and for unloading said container from said vehicle by reversing the aforesaid movements, the improvement comprising:

a slidable track means disposed and guided in a longitudinal direction in said tiltable frame, said tiltable frame being mounted for pivotal movement on said vehicle about a horizontal axis near a pick-up location for said containers, a movable carriage mounted for longitudinal movement on said slidable track means, a drive mounted on said frame, flexible pulling means coupled to said drive and said carriage for moving said carriage, hooking means connected to said flexible pulling means for engaging containers to be loaded and unloaded from said vehicle, a plurality of different container gripping means including said hooking means and at least one gripping means mounted on said carriage, each of said plurality of gripping means engaging a different type of container thereby allowing the use of said self-loading apparatus on a variety of different types of containers.

2. The apparatus as claimed in claim 1 in which one of a plurality of different container gripping means on said carriage is a sea container gripping means having an elongated support with the central portion thereof mounted on said carriage, two hooking means mounted on opposite extremes of said support adapted to engage a sea container at two points on opposite sides of the container.

3. The apparatus as claimed in claim 1 wherein said drive means is a winch and said flexible pulling means comprises a cable or chain carrying said hook for gripping a container to which said hook is attached.

4. The apparatus as claimed in claim 1, wherein said plurality of different container gripping means comprises at least three gripping means, two of which are vertically spaced gripping means on said carriage and said third gripping means is spaced horizontally from at least one of said vertically spaced gripping means.

5. A self-loading and unloading apparatus for a vehicle having a tiltable frame mounted on said vehicle, gripping means movably positioned on said frame for engaging an interchangeable container and lifting said container from a lower level onto said vehicle by vertical and horizontal movements such that a first lower terminal edge of the container is moved onto said vehicle and that thereupon the container is moved longitudinally onto said vehicle and for unloading said container from said vehicle by reversing the aforesaid movement, the improvement comprising:

a plurality of different container gripping means movably mounted at different positions on said tiltable frame, said tiltable frame carring a track means slidably disposed in a longitudinal direction; said slidable track means being guided by said tiltable frame, said tiltable frame being mounted for pivotal movement on said vehicle about a horizontal axis near a pick-up location for said containers, a movable carriage mounted for longitudinal movement on said slidable track means on said tiltable frame, at least one of said plurality of different container gripping means being mounted on said carriage, a flexible pulling means coupled to said carriage and a drive means whereby said drive means and said flexible pulling means move said carriage over said tiltable frame, a hooking means coupled to said flexible pulling means, said hooking means and said flexible pulling means comprising at least another of said plurality of different container gripping means for engaging containers to be loaded and unloaded from said vehicle.

* * * * *